United States Patent [19]

Negi

[11] Patent Number: 5,745,282
[45] Date of Patent: Apr. 28, 1998

[54] LIGHT MODULATION DEVICE

[75] Inventor: Keiji Negi, Tokyo, Japan

[73] Assignee: Ando Electric Co., Ltd., Tokyo, Japan

[21] Appl. No.: 621,963

[22] Filed: Mar. 26, 1996

[30] Foreign Application Priority Data

Mar. 28, 1995 [JP] Japan ................................. 7-070047

[51] Int. Cl.$^6$ .................................................. G02F 1/00
[52] U.S. Cl. ............................ 359/322; 359/181; 359/279
[58] Field of Search ................................. 359/181, 321, 359/245, 279, 322

[56] References Cited

U.S. PATENT DOCUMENTS 5,359,449  10/1994  Nishimoto et al. ...................... 359/181

FOREIGN PATENT DOCUMENTS 05-224162  9/1993  Japan .

Primary Examiner—Georgia Y. Epps
Assistant Examiner—Dawn-Mavie Bey
Attorney, Agent, or Firm—Finnegan, Henderson, Farabow, Garret & Dunner, L.L.P.

[57] ABSTRACT

A light modulation device includes a lithium niobate light modulator, an amplifier, and a bias control circuit. The lithium niobate light modulator modulates light from a light source in accordance with an input electrical signal, and outputs the modulated light. The lithium niobate light modulator includes a terminal for terminating the electrical signal. The amplifier amplifies the electrical signal to a level where it can drive the lithium niobate light modulator, and outputs the amplified signal to the lithium niobate light modulator. The amplifier includes an amplifying element at an output stage. A bias voltage of the amplifying element is set by externally supplied DC voltages. The bias control circuit supplies the DC voltages to the amplifying element, and a DC operating voltage to the terminating terminal of the lithium niobate light modulator to set a modulation operating point of the lithium niobate light modulator.

6 Claims, 4 Drawing Sheets

LIGHT MODULATION DEVICE

BACKGROUND OF THE INVENTION

1. Field of the Invention

The present invention relates to externally modulated light intensity modulation devices used in optical communication, where the modulator is provided separate to the light source, and in particular to light modulation devices which contain a lithium niobate light modulator (herein abbreviated as LN modulator).

2. Description of the Related Art

In order to accommodate diverse communication services, considerable research is being carried out on increasing the speed and volume of optical fiber communication systems, particularly major trunk lines. Furthermore, in the field of new synchronous digital communication networks, research and development is being carried out on various apparatus and devices in order to develop systems with transmission speeds of 10 gigabits per second, well beyond current levels of between 156 megabits and 2.4 gigabits per second.

One important element in the construction of this kind of optical fiber communication system is a light modulation device to modulate the intensity of the light entering from the light source. Light modulation devices employing a direct modulation method involving modulation of the laser light intensity by direct control of the electric current in a semiconductor laser are available. In these modulation devices employing direct modulation, the modulation is accompanied by a fluctuation in the wavelength (herein referred to as chirping), resulting in distortions in the light pulse produced by the modulation. This type of distortion of the light pulse becomes more of a concern as the transmission speeds are increased, making the transmission of optical signals at gigabit per second transmission speeds problematic.

Consequently, for high speed optical fiber communication systems, externally modulated light modulation devices, which feature semiconductor lasers with separate external modulators, and which display little chirping are being investigated. Small, yet feasible electric field absorption effect light modulators, and LN modulators, which in principle should allow total removal of chirping, are the two systems being most actively researched.

FIG. 6 shows an example of a current light modulation device which utilizes an LN modulator. In this figure, numeral 1 refers to a light source, 2 to an LN modulator, 3 to a light output terminal, 4 to an electrical input terminal, 5 to an amplifier, 6-1 and 6-2 to bias T filters, 7 to a bias control circuit, 8 to an electrical power terminal, and 9 to a terminator.

The light source 1 is constructed of a semiconductor laser or similar, and outputs laser light of uniform wavelength and power to the LN modulator 2. The LN modulator 2 has four terminals labeled $2a \sim 2d$, where terminal $2a$ is the input terminal for laser light emitted from the light source 1, terminal $2c$ is the input terminal for the modulation signal (electrical signal) used to modulate this laser light, terminal $2b$ is the terminal from which the modulated laser light wave (light pulse), which has been modulated by the modulation signal, is output, and terminal $2d$ is the terminal from which the modulation signal is output, following its passage through the LN modulator. The light pulse formed in the LN modulator 2 is output from terminal $2b$, and then supplied to the outside via the light output terminal 3.

An electrical signal (modulation signal) with an ECL level or SCFL level amplitude of less than 1 volt is input through the electrical input terminal 4. The amplification circuit 5 then amplifies this modulation signal to a level sufficient to drive the LN modulator 2 and outputs it to bias T filter 6-1. The bias T filter 6-1 supplies DC voltage from the electrical power terminal 8 to the drain terminal of the electric field effect transistor (herein abbreviated as FET) of the amplifier's output stage, via coil $6L_1$, while also outputting the AC component of the modulation signal from amplifier 5 to the LN modulator 2, via the condenser $6C_1$.

The LN modulator 2, uses the modulation signal from bias T filter 6-1 to modulate the intensity of the incoming laser light from the light source 1, and then outputs a light pulse. Furthermore, the modulation signal from bias T filter 6-1 travels along the transmission path inside the LN modulator 2, and is output from the LN modulator 2 to bias T filter 6-2. Bias T filter 6-2 takes this modulation signal and adds to it the DC voltage output from the bias control circuit 7 and subsequently passed through the coil $6L_2$. It then supplies this modulation signal to the terminator 9 via the condenser $6c_2$. The bias control circuit 7 generates the DC voltage supplied to bias T filter 6-2. The terminator 9 terminates the modulation signal output from bias T filter 6-2.

FIG. 7 is a circuit diagram illustrating an example configuration for the amplifier 5. As shown in this diagram, the amplifier 5 is a typical FET amplification circuit, with multi stage construction, employing AC coupling of FET $5_1 \sim 5_N$. The input terminal $5a$ of the amplifier 5 is terminated by resistor Rt, which has an applied voltage Vt at its other terminal. Furthermore, the source terminals for each of the FET $5_1 \sim 5_N$ are connected to ground, and each of the gate terminals is connected to a resistor Rd, which has an applied reference voltage of Vgg at its other terminal. The drain terminals of FETs $5_1 \sim 5_{N-1}$ are each connected to a resistor Rd, which has an applied power source voltage of Vdd at its other terminal, as well as being connected, via a condenser C, to FET $5_2 \sim 5_N$, respectively, of the next stage. Furthermore, the drain terminal of the FET $5_N$ of the output stage is connected directly to the output terminal $5b$, resulting in an open drain output system.

FIG. 8 shows the characteristics of the LN modulator 2 for a light modulation device constructed in this manner. In this graph, the vertical axis represents the light output rate, standardized against the light output when the modulation signal level (the voltage of the modulation signal entering the LN modulator) is 0 volts, and the horizontal axis represents the modulation signal level. As is shown by the solid line L, the light output from the LN modulator 2 varies with the modulation signal level, and for LN modulators 2 with modulation speeds of greater than 1 gigabit per second, the difference between modulation signal Vmax, where maximum (100%) light output is provided, and modulation signal Vmin, where minimum (0%) light output is provided, is normally between 3 and 6 volts. Consequently, this requires the amplifier 5 to amplify the amplitude of the modulation signal (digital signal) from the input terminal 4 to a level of 3~6 volts, and then output it to the LN modulator.

Thus, this modulation signal is a digital signal, and the amplifier 5 should amplify the modulation signal so that at high levels of the digital signal the voltage is Vmax, and at low levels the voltage is Vmin. In such cases the DC operating voltage of the modulation signal must be set somewhere between the two voltages Vmax and Vmin. This corresponds to the most suitable modulation conditions for operation of the LN modulator 2.

On the other hand however, the characteristics of the LN modulator 2 may vary with factors such as changes in temperature and humidity, element dispersion, and age. A change in modulator characteristics, with the DC operating voltage being offset by a voltage of Vos (as shown by the broken line L'), may then occur. In order to maintain the LN modulator 2 in its aforementioned most suitable operating condition, the DC operating voltage of the modulation signal must therefore be corrected by the amount Vos. In this particular case, the DC operating voltage needs to be increased by the amount Vos.

However, with the amplifier 5 described above, the source terminal of the FET $5_N$ of the output stage is connected to ground, and the gate bias voltage is fixed, so the DC voltage at the output terminal 5b of the amplifier 5 is constant. In other words, with this type of amplifier 5 unit, it is impossible to correct for the voltage Vos described above. Consequently, the bias T filter 6-1, which supplies the AC component of the output signal (modulation signal) from the amplifier 5 to the LN modulator 2, and the bias T filter 6-2, which applies the DC bias voltage from the bias control circuit 7 to the LN modulator 2, are required.

However, with this type of light modulation device two bias T filters, 6-1 and 6-2 exist in the transmission path of the modulation signal, and so due to either the transmission frequency band characteristics of these two bias T filters 6-1 and 6-2, or the effect of reflections within the LN modulator, the wave form of the modulation signal is distorted. Consequently, the problem arises that the wave form of the light modulation output (light pulse) from the LN modulator 2 is also distorted.

Furthermore, as described above, the bias T filters 6-1 and 6-2 employ a coil in their construction. For these bias T filters 6-1 and 6-2, using a coil as a construction component is more difficult than a construction employing a resistance and a capacitance, and also makes miniaturization of the components difficult. Consequently, the bias T filters 6-1 and 6-2 have a large component surface area when compared with the other components, thus hindering the miniaturization of the light modulation device.

SUMMARY OF THE INVENTION

It is an object of the invention to provide a light modulation device which does not use bias T filters, and wherein a lowering in the distortion of the light modulation output is possible together with miniaturization.

In order to achieve the above object, the light modulation device according to the present invention comprises;

a lithium niobate light modulator, which modulates light from a light source in accordance with an input electrical signal, and then outputs the modulated light, and which has a terminal for terminating said electrical signal;

a variable bias amplifier, which amplifies said electrical signal to a level where it can drive said lithium niobate light modulator, and then outputs the amplified signal to the lithium niobate light modulator, and in which a bias voltage of the amplifying element of the output stage is set by an externally supplied DC voltage;

and a bias control circuit, which supplies said DC voltage to said variable bias amplifier, and which supplies, to said terminal via a terminating resistor, a DC operating voltage for setting the modulation operating point of said lithium niobate light modulator.

The light modulation device according to an alternative embodiment of the present invention comprises;

a lithium niobate light modulator, which modulates light from light source in accordance with an input electrical signal, and then outputs the modulated light, and which is fitted with a terminal for terminating said electrical signal;

an amplifier, which amplifies said electrical signal to a level where it can drive said lithium niobate light modulator and then outputs the amplified signal;

a buffer circuit, which drives said lithium niobate modulator in accordance with the output from said amplifier, and in which the bias voltage is set by an externally supplied DC voltage; and a bias control circuit, which supplies said DC voltage to said amplifying element, and which supplies, to said terminal via a terminating resistor, a DC operating voltage for setting the modulation operating point of said lithium niobate light modulator.

The output form of the amplifying element and the buffer circuit may be an open output form. The amplifying element and buffer circuit may be an electrical field effect transistor.

In those situations where, due to temperature or humidity variations, element dispersion, or age, the most suitable DC operating voltage to drive the lithium niobate modulator at peak efficiency changes, the bias control circuit supplies the most suitable DC operating voltage to the lithium niobate modulator via the terminating resistor. Furthermore, since the bias control circuit simultaneously changes the bias voltage of the amplifying element of the amplifier's output stage in accordance with the above mentioned DC operating voltage, then variations in the setting of the bias voltage of the amplifying element, which occur due to the change in DC operating voltage are corrected.

The bias control circuit changes the bias voltage of the buffer circuit in accordance with the DC operating voltage, thus correcting variations in the setting of the bias voltage of the buffer circuit, which develop due to the change in DC operating voltage.

As explained above, because the light modulation device of the present invention is constructed without the use of bias T filters, a distortion free electrical signal can be used to drive the lithium niobate light modulator. Consequently, it is possible to obtain a modulated output with a good quality wave form.

Furthermore, as it does not use bias T filters, the circuit can be produced with fewer parts, and it is thus possible to construct a smaller light modulation device which occupies less surface area.

DESCRIPTION OF THE PREFERRED EMBODIMENTS

An explanation of working examples of the invention is given below, with reference to the drawings.

Figure 1:
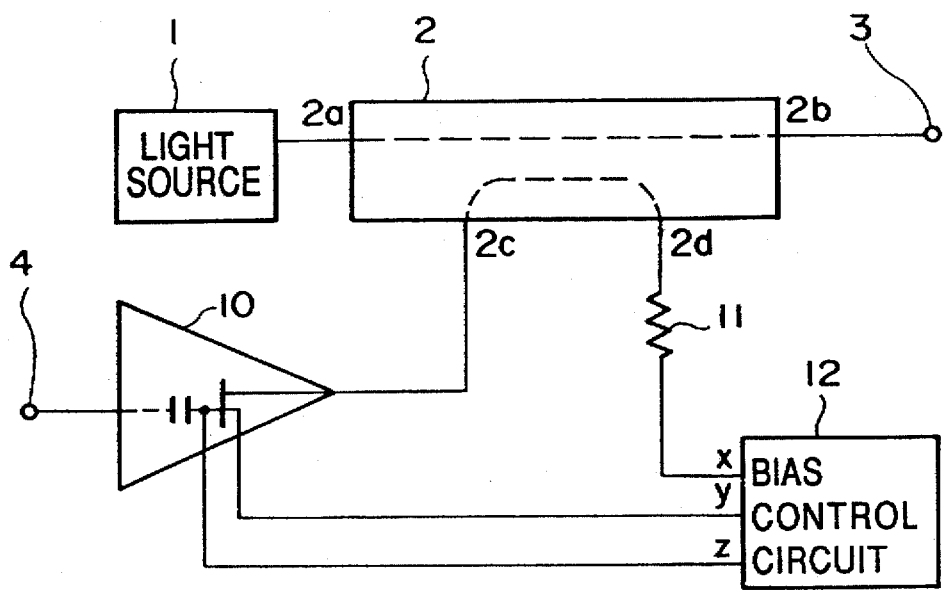
FIG. 1 is a block diagram outlining the construction of a first working example of the invention.
Figure 6:
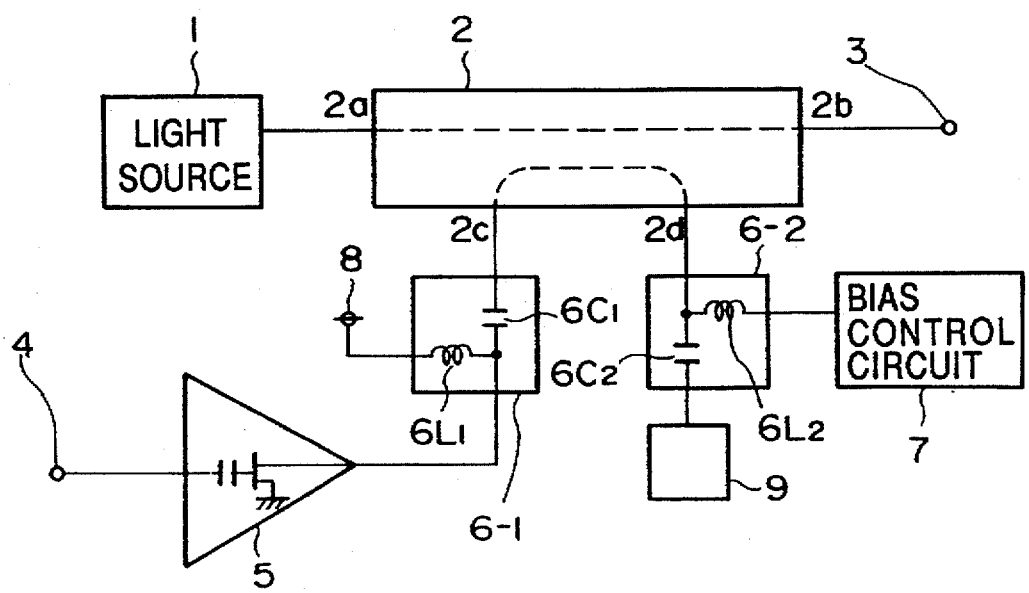
FIG. 6 is a block diagram showing an example construction of a conventional light modulation device.

FIG. 1 is a block diagram outlining the construction of a first working example. Construction elements which are the same as those previously explained for FIG. 6 are given the same numbers, and their explanations are abbreviated. In this figure, number 10 refers to an amplifier, 11 to a terminating resistor, and 12 to a bias control circuit. Thus, construction of this particular working example differs from the current light modulation devices shown in FIG. 6, by the presence of amplifier 10, terminating resistor 11, and bias control circuit 12.

Figure 2:
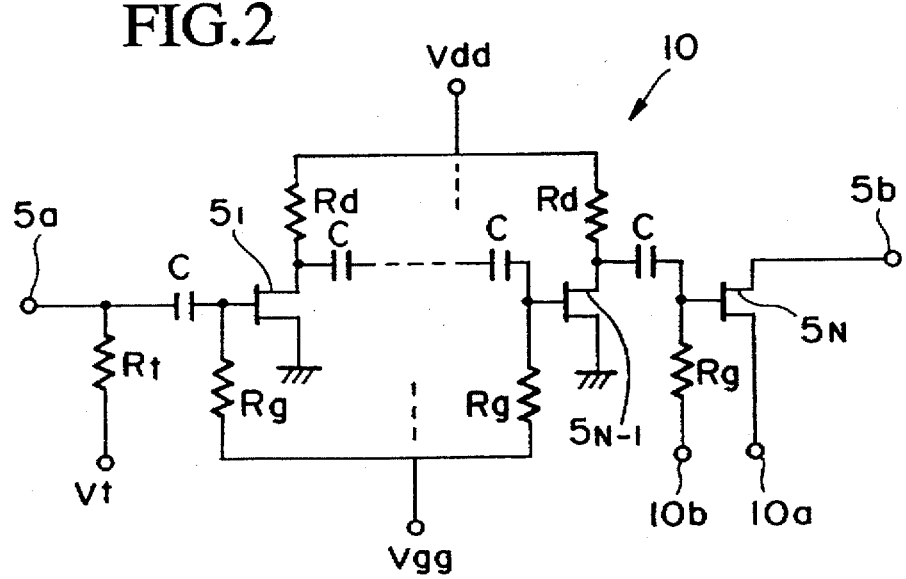
FIG. 2 is a circuit diagram outlining the construction of an amplifier of the first working example.
Figure 7:
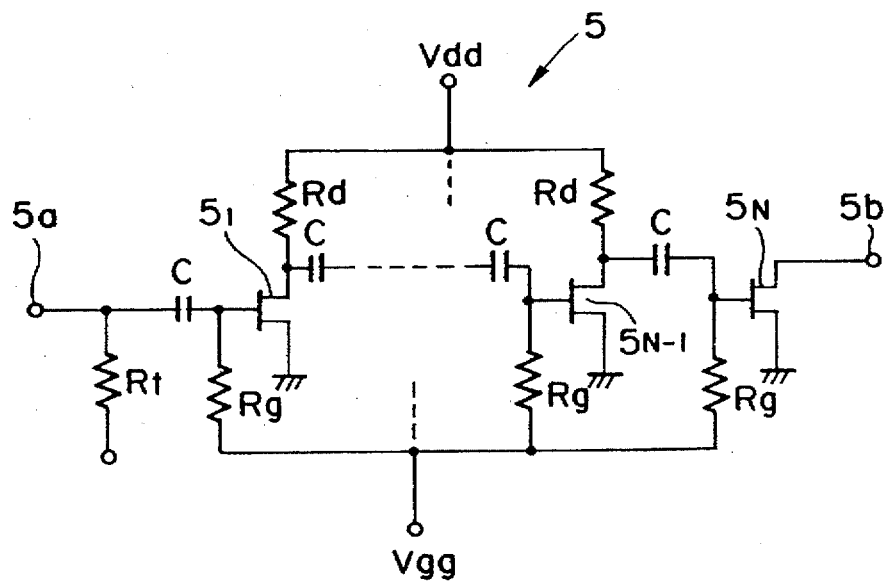
FIG. 7 is a circuit diagram showing an example construction of an amplifier of the conventional light modulation device.
Figure 8:
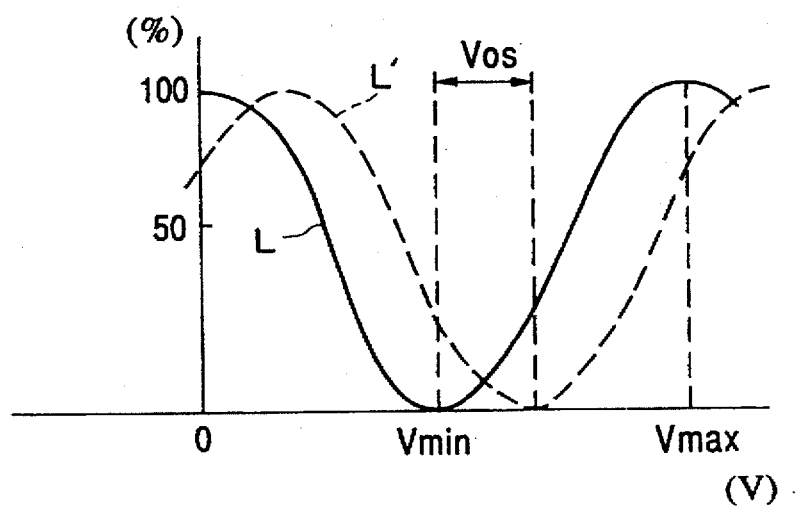
FIG. 8 is a diagram showing the characteristics of an LN modulator.

FIG. 2 is a circuit diagram detailing the construction of the amplifier 10. It differs from the currently used amplifiers 5 of FIG. 7, in so far as it is constructed so that for the FET $5_N$ of the output stage, the source terminal, and one of the terminals of the resistor Rg, which is connected to the gate terminal, are connected to terminals 10a and 10b respectively, and the source voltage and gate voltage of the FET $5_N$ can thus be set by supplying external voltages to the terminals 10a and 10b respectively.

In FIG. 1, the amplifier 10 amplifies the modulation signal input via the electrical input terminal 4, to an amplitude sufficient to drive the LN modulator 2, and then outputs this amplified signal directly to the LN modulator. The terminating resistor 11 sets the voltage amplification ratio of the FET $5_N$ of the output stage, as well as terminating the modulation signal input into the LN modulator. Furthermore, the terminating resistor 11 also supplies a DC voltage x, output from the bias control circuit 12, to the drain terminal of the FET $5_N$ by passage through both itself and the LN modulator.

The bias control circuit 12, in addition to its connection to the terminating resistor 11 mentioned above, is also connected to terminals 10a and 10b of the amplifier 10, and supplies DC voltages of y and z, to terminals 10a and 10b respectively. This bias control circuit 12 fixes the DC operating voltage of the LN modulator 2 at the aforementioned most suitable level by controlling the value of DC voltage x, while simultaneously fixing the amplification operating bias point of the FET $5_N$ by controlling the values of DC voltages y and z.

By constructing the light modulator in this way, it is possible to correct for the above mentioned change in characteristics of the LN modulator 2, namely the change in the DC operating voltage, which determines the most suitable operating conditions, by changing the DC voltage x output by the bias control circuit 12. For example, if the aforementioned DC operating voltage were to increase by a voltage of Vos, then the bias control circuit would increase the value of the DC voltage x by the same amount Vos. In such a case, the bias voltage of the FET $5_N$'s drain terminal will also increase by Vos, so the bias control circuit 12 also increases the voltages of DC voltages y and z by an amount Vos, thus increasing the bias voltages at both the source terminal and the gate terminal of the FET $5_N$ by the same amount Vos.

Consequently, the DC operating voltage of the modulation signal supplied to the LN modulator 2 can be continually maintained at the most suitable level, and the balance of the bias voltages supplied to the drain, source, and the gate terminals of the FET $5_N$ can be kept constant.

Figure 3:
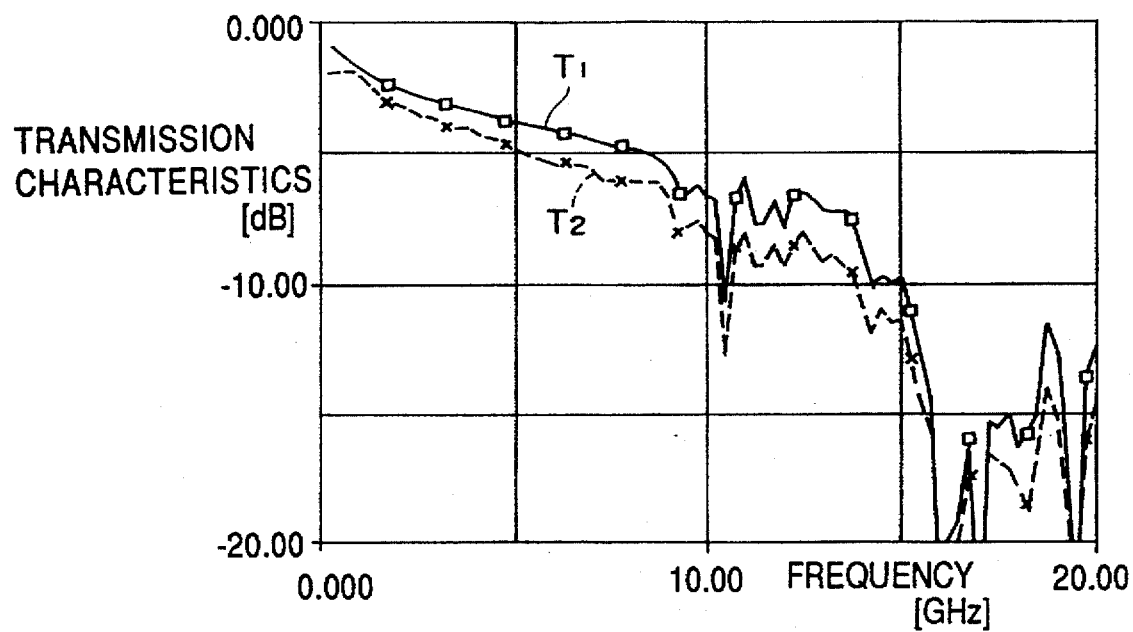
FIG. 3 is a diagram showing the characteristics of a light modulation device of the invention.

The solid line T1 shown in FIG. 3, represents the frequency characteristics, for this particular working example, of the transmission level from output from the amplifier 10 until reaching the terminating resistor 11. In this figure, the broken line T2, represents the frequency characteristics, for currently used light modulation devices, of the transmission level from the amplifier 5 until the terminator 9. As can be appreciated from this diagram, the transmission level for the working example of the present invention is approximately 1~2 dB higher than current levels, for all frequencies between 0 and 20 GHz, meaning that transmission to the terminating resistor 11 is occurring with less attenuation due to reflections.

Figure 4:
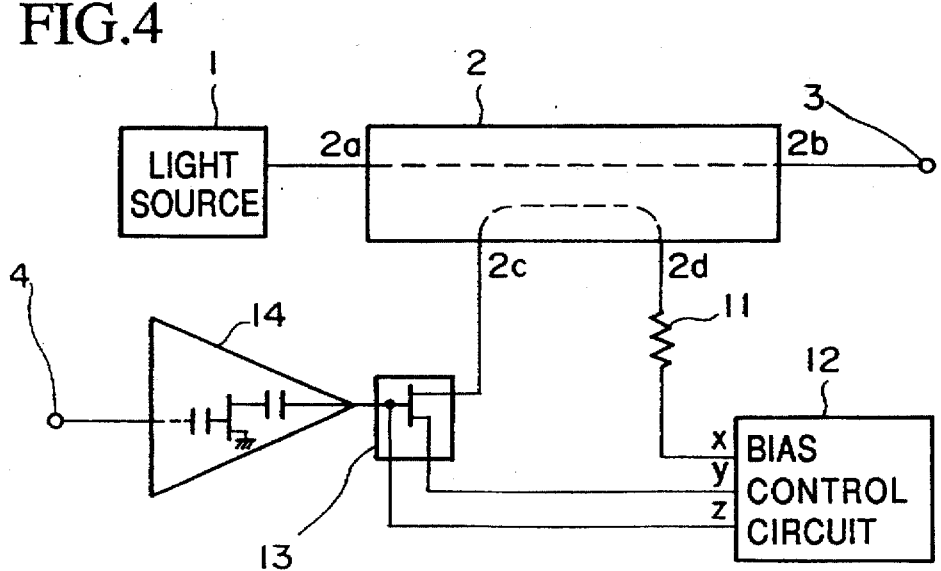
FIG. 4 is a block diagram outlining the construction of a second working example of the invention.
Figure 5:
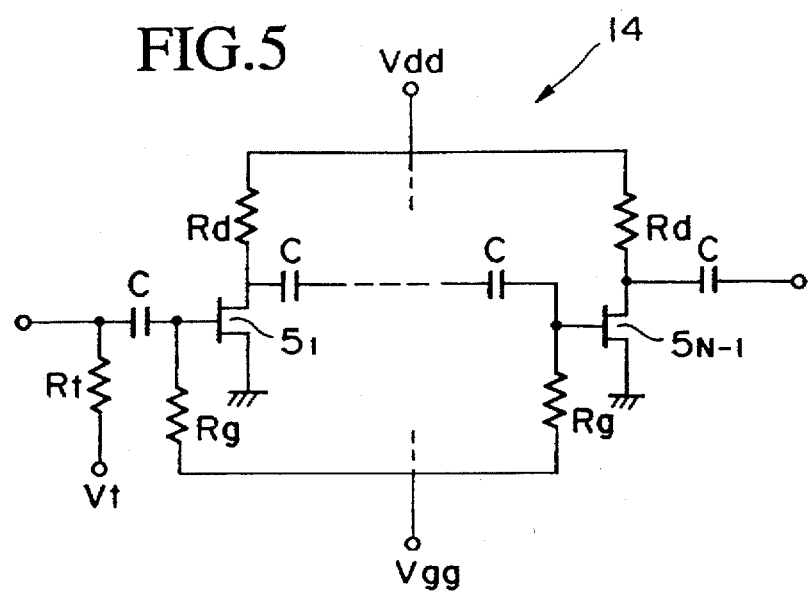
FIG. 5 is a circuit diagram outlining the construction of an amplifier of the second working example.

FIG. 4 is a block diagram outlining the construction of the second working example of the invention. In this working example, the output stage of the amplifier 10 from the first working example is replaced by a separately constructed buffer circuit 13. More specifically, in this working example, the output stage of amplifier 10, which is constructed around the FET $5_N$, is constructed as a separate circuit, buffer circuit 13. Furthermore, the remaining circuits of amplifier 10, excluding the FET $5_N$, are renamed amplifier 14. FIG. 5 is a circuit diagram outlining the construction of the amplifier 14. As shown in this diagram, the amplifier 14 is constructed as an amplification circuit which includes the FET $5_1$_FET $5_{N-1}$, but excludes the FET $5_N$. The output form is thus not open drain, and only the AC component is output via the condenser C.

In this working example, the DC operating voltage of the modulation signal to be input into the LN modulator, is fixed at the most suitable level, by applying a DC voltage from the bias control circuit 12, to the source, gate, and drain terminals of the buffer circuit 13. With the construction of this second working example, because it differs from the first working example by having the buffer circuit 13 constructed as a separate circuit to the amplifier 14, the capacity to drive the LN modulator 2 can be easily altered by altering the characteristics of the buffer circuit 13.

What is claimed is:

1. A light modulation device comprising:
    a lithium niobate light modulator for modulating light from a light source in accordance with an input electrical signal, and then outputting the modulated light, the lithium niobate light modulator having a terminal for terminating said electrical signal;
    a variable bias amplifier for amplifying said electrical signal to a level where it can drive said lithium niobate light modulator, and then outputting the amplified signal to said lithium niobate light modulator, the variable bias amplifier including an amplifying element at an output stage, a bias voltage of the amplifying element being set by an externally supplied DC voltage; and
    a bias control circuit for supplying said DC voltage to said variable bias amplifier, and supplying, to said terminal via a terminating resistor, a DC operating voltage for setting a modulation operating point of said lithium niobate light modulator.

2. A light modulation device comprising:
    a lithium niobate light modulator for modulating light from a light source in accordance with an input electrical signal, and then outputting the modulated light, the lithium niobate light modulator having a terminal for terminating said electrical signal;
    an amplifier for amplifying said electrical signal to a level where it can drive said lithium niobate light modulator and then outputting the amplified signal;
    a buffer circuit for driving said lithium niobate modulator in accordance with the amplified signal output from said amplifier, a bias voltage input to said buffer circuit being set by an externally supplied DC voltage; and a bias control circuit for supplying said DC voltage to said buffer circuit, and supplying, to said terminal via a terminating resistor, a DC operating voltage for setting a modulation operating point of said lithium niobate light modulator.

3. A light modulation device as claimed in claim 1, wherein an output form of said amplifying element is an open output form.

4. A light modulation device as claimed in claim 1 or 3, wherein said amplifying element is an electrical field effect transistor.

5. A light modulation device as claimed in claim 2, wherein an output form of said buffer circuit is an open output form.

6. A light modulation device as claimed in claim 2 or 5, wherein said buffer circuit is an electrical field effect transistor.

* * * * *